United States Patent
Gojo

(10) Patent No.: US 7,431,062 B2
(45) Date of Patent: Oct. 7, 2008

(54) PNEUMATIC RADIAL TIRE HAVING CONTINUOUS THIN GROOVE AT BUTTRESS

(75) Inventor: Atsushi Gojo, Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 83 days.

(21) Appl. No.: 10/933,412

(22) Filed: Sep. 3, 2004

(65) Prior Publication Data

US 2005/0051250 A1  Mar. 10, 2005

(30) Foreign Application Priority Data

Sep. 5, 2003   (JP)   ............. 2003-314304

(51) Int. Cl.
  *B60C 11/01* (2006.01)
(52) U.S. Cl. ............ 152/209.16; 152/209.23; 152/207.27
(58) Field of Classification Search ............ 152/209.15, 152/209.16, 209.23, 209.24, 209.27
  See application file for complete search history.

(56) References Cited

U.S. PATENT DOCUMENTS 5,522,442 A * 6/1996 Kishi .................... 152/209.16
6,109,316 A * 8/2000 Janajreh ................ 152/209.27
6,488,064 B1 * 12/2002 Radulescu ............. 152/209.27

FOREIGN PATENT DOCUMENTS

| JP | 02-048202 A1 | 2/1990 |
| JP | 2-246806 | * 10/1990 |
| JP | 03-253408 A1 | 11/1991 |
| JP | 07-164825 A1 | 6/1995 |
| JP | 08-132824 A1 | 5/1996 |
| JP | 08-290706 A1 | 11/1996 |
| JP | 2002-19422 | * 1/2002 |
| JP | 2002-79809 | * 3/2002 |
| JP | 2003-039917 A1 | 2/2003 |

* cited by examiner

*Primary Examiner*—Steven D Maki
(74) *Attorney, Agent, or Firm*—Greer, Burns & Crain, Ltd.

(57) ABSTRACT

A pneumatic radial tire having a thin groove continuous in a tire circumferential direction at a buttress formed between a shoulder of a tread and a sidewall includes a tire contour portion that is formed between an end portion of the shoulder and a groove floor of the thin groove. A tire transverse direction outermost portion at a shoulder side curved portion is disposed further toward a tire radial direction inner side than a sidewall side end portion of a sidewall side groove wall surface of the thin groove.

3 Claims, 6 Drawing Sheets

PNEUMATIC RADIAL TIRE HAVING CONTINUOUS THIN GROOVE AT BUTTRESS

CROSS-REFERENCE TO RELATED APPLICATIONS

The present document incorporates by reference the entire contents of Japanese priority document, 2003-314304 filed in Japan on Sep. 5, 2003.

BACKGROUND OF THE INVENTION

1. Field of the Invention

The present invention relates to a technology for improving tear resistance at a shoulder of a pneumatic radial tire having a thin groove continuous in a tire circumferential direction at a buttress.

2. Description of the Related Art

FIGS. 5A and 5B are schematics of an example of a conventional pneumatic radial tire. As shown in FIG. 5A, in the conventional pneumatic radial tire, particularly in a pneumatic radial tire 100 for heavy loads that is mounted to a truck or a bus, a plurality of circumferential direction grooves 102 that are continuous in a tire circumferential direction are formed in a tread 101. Ribs (blocks) 103 are formed by being demarcated at least by the circumferential direction grooves 102. In the conventional pneumatic radial tire 100, a temporary rib 107 is formed by a thin groove 106 in an end portion 105 of a shoulder 104 of the tread 101. By providing the thin groove 106, it is possible to prevent a ground-contact pressure of a sidewall side end portion (not shown) of the ribs 103 of the shoulder 104 from becoming higher than a ground-contact pressure of the ribs (blocks) at the center of the tire (not shown), and to improve uneven wear resistance of the shoulder 104 of the tread 101.

However, when the truck or the like on which the conventional pneumatic radial tires 100 are installed rides up over a curb or the like at a road surface, the temporary rib 107 formed at the end portion 105 of the shoulder 104 of the tread 101 breaks, i.e., cut-resistance becomes poor. Thus, as shown in FIG. 5B, there has been proposed a pneumatic radial tire 110 that has a thin groove 121 continuous in the tire circumferential direction, at a buttress 120 formed between the tread 101 and a sidewall (not shown). According to the conventional pneumatic radial tire 110, breaking of the rib 103 of the shoulder 104 of the tread 101 can be suppressed.

When rims on which the pneumatic radial tires 110 are mounted are installed at a truck or the like whose distance between axes is long, and the truck turns at an extremely low speed, e.g., when the pneumatic radial tires 110 rotate at the position with respect to the road surface, the following problems arise. FIG. 6A is a schematic for illustrating a relationship between the road surface and the conventional pneumatic radial tire in an unloaded state. FIG. 6B is a schematic for illustrating a relationship between the road surface and the conventional pneumatic radial tire in a loaded state. FIG. 6C is a schematic for illustrating a relationship between the road surface and the conventional pneumatic tire that is in the loaded state and at which lateral force has arisen. When load F is applied to the pneumatic radial tire 110 in the unloaded state shown in FIG. 1, as shown in FIG. 6B, the rib (block) 103 of the shoulder 104 of the tread 101 contacts a road surface 200. At this time, the buttress 120 deforms such that the thin groove 121 is closed. A tire transverse direction outermost portion P, which is at a shoulder side curved portion 131 of a tire contour portion 130 formed between the end portion 105 of the shoulder 104 and a groove floor 121a of the thin groove 121, is in a state of projecting outwardly, i.e., a state in which it is not covered by the buttress 120.

From the state shown in FIG. 6B, when the truck or the like, to which the pneumatic radial tires 110 are mounted, turns at an extremely low speed, lateral force Y arises. Due to this lateral force Y, the pneumatic radial tire 110 deforms such that the buttress 120 contacts the road surface 200. Accordingly, the tire transverse direction outermost portion P of the shoulder side curved portion 131 of the tire contour portion 130 contacts the road surface 200, and then catches on the road surface 200 due to the lateral force Y. Because the thin groove 121 is closed by the buttress 120, the rib 103 of the shoulder 104 and the buttress 120 form rigid bodies. A difference in rigidities arises at a portion of the thin groove 121 closed by the buttress 120, i.e., a portion where a sidewall side end portion Q of a sidewall side groove wall surface 121b of the thin groove 121 contacts the tire contour portion 130, and a region further toward the road surface 200 side of the sidewall side end portion. Namely, cracks are formed from a portion near a border of the difference in rigidities, and there is the problem that the rib 103 of the shoulder 104 tears off.

SUMMARY OF THE INVENTION

It is an object of the present invention to solve at least the above problems in the conventional technology.

A pneumatic radial tire having a thin groove continuous in a tire circumferential direction at a buttress formed between a shoulder of a tread and a sidewall includes a tire contour portion that is formed between an end portion of the shoulder and a groove floor of the thin groove. A tire transverse direction outermost portion at a shoulder side curved portion is disposed further toward a tire radial direction inner side than a sidewall side end portion of a sidewall side groove wall surface of the thin groove.

The other objects, features, and advantages of the present invention are specifically set forth in or will become apparent from the following detailed description of the invention when read in conjunction with the accompanying drawings.

DETAILED DESCRIPTION

Exemplary embodiments of a pneumatic radial tire having a buttress according to the present invention will be described below in detail with reference to the accompanying drawings. Note that the invention is not limited by the embodiment, and components in the embodiments below will include ones essentially identical or easily occur to those skilled in the art. Because an internal structure of a pneumatic radial tire in the following embodiments is similar to a structure of a general radial tire, description thereof will be omitted.

Figure 1:
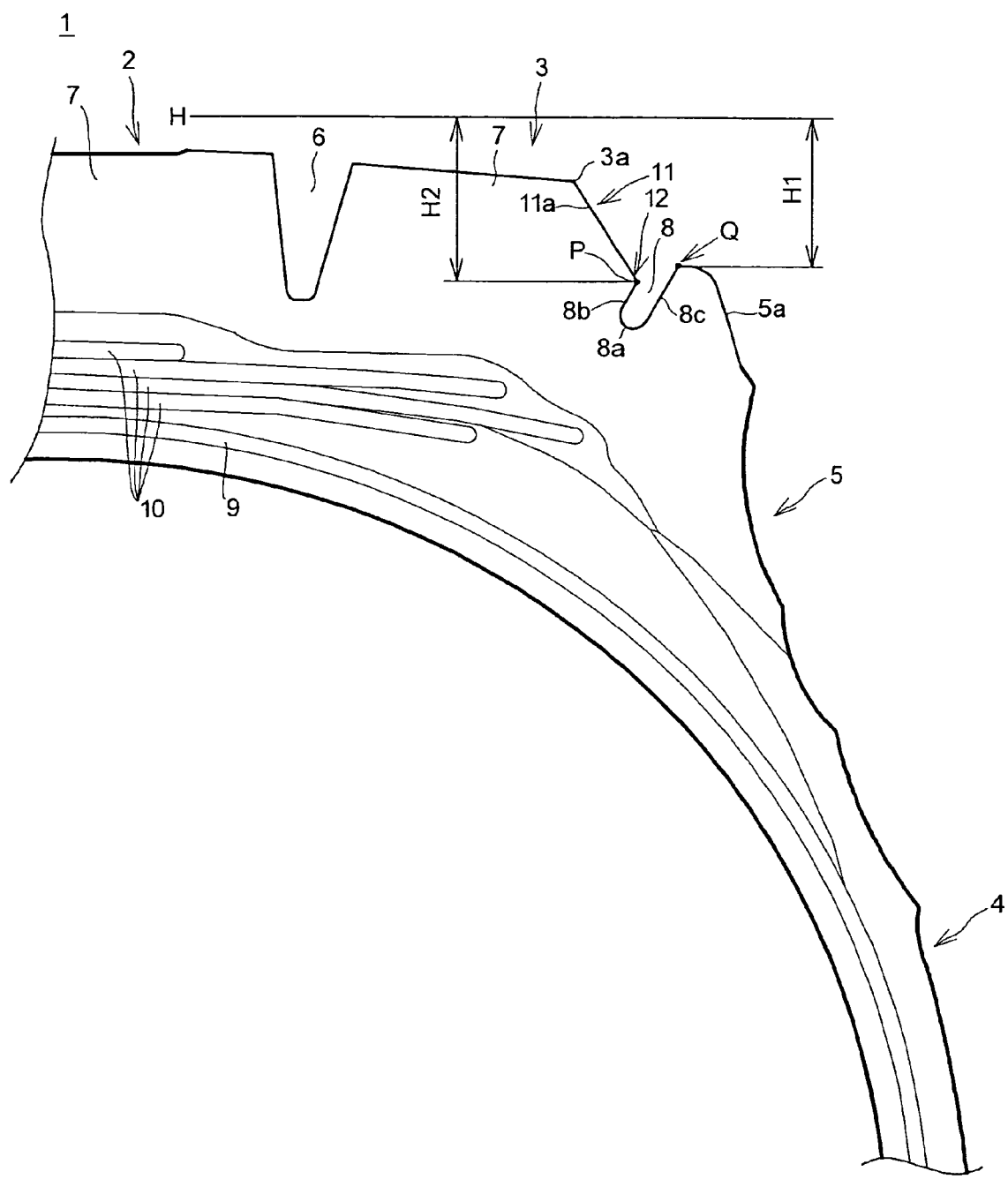
FIG. 1 is a schematic of an example of a pneumatic radial tire according to the present invention.
Figure 2A:
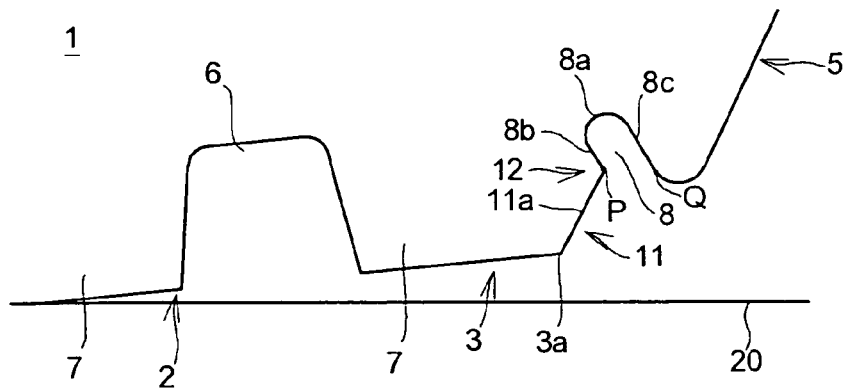
FIG. 2A is a schematic for illustrating a relationship between a road surface and the pneumatic radial tire according to the present invention in an unloaded state.
Figure 2B:
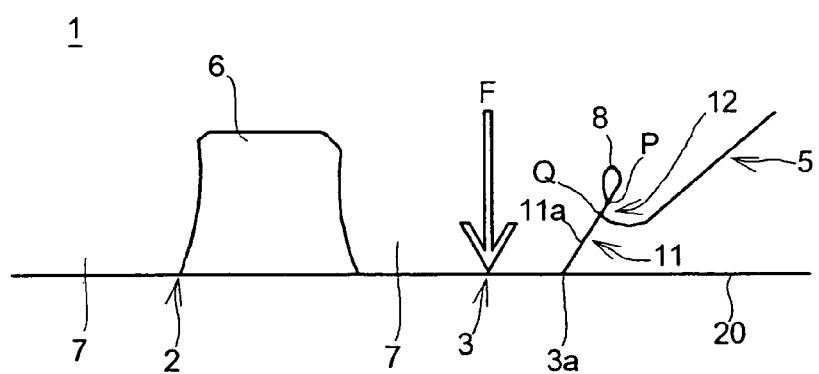
FIG. 2B is a schematic for illustrating a relationship between the road surface and the pneumatic radial tire according to the present invention in a loaded state.
Figure 2C:
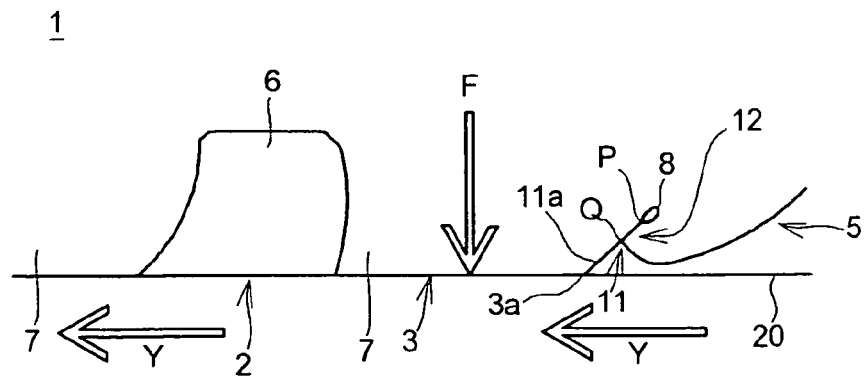
FIG. 2C is a schematic for illustrating a relationship between the road surface and the pneumatic radial tire according to the present invention that is in the loaded state and at which lateral force is applied.

FIG. 1 is a schematic of an example of a pneumatic radial tire according to the present invention. FIG. 2A is a schematic for illustrating a relationship between a road surface and the pneumatic radial tire according to the present invention in an unloaded state. FIG. 2B is a schematic for illustrating a relationship between the road surface and the pneumatic radial tire according to the present invention in a loaded state. FIG. 2C is a schematic for illustrating a relationship between the road surface and the pneumatic radial tire according to the present invention that is in the loaded state and at which lateral force is applied. Each of these diagrams is a partial sectional view of a cross-section in which the pneumatic radial tire is cut in a meridian.

As shown in FIG. 1, at a pneumatic radial tire 1 according to the present invention, a buttress 5 is formed between a shoulder 3 of a tread 2 and a sidewall 4. Ribs 7 (blocks demarcated by lengthwise grooves and lateral groove when the plural lateral grooves are formed in a tire transverse direction), which are demarcated at least by a plurality of circumferential direction grooves 6 formed continuously in a tire circumferential direction, are formed at the tread 2. A thin groove 8, which is continuous in the tire circumferential direction, is formed in the buttress 5. The circumferential direction grooves 6 and the ribs 7 of the tread 2 are formed above a plurality of (in FIG. 1, four layers) belt layers 10 that are layered on a carcass layer 9.

A tire contour portion 11 is formed between an end portion 3a of the shoulder 3 of the tread 2 and a groove floor 8a of the thin groove 8. The tire contour portion 11 is structured by an inclined portion 11a, which is formed from the end portion 3a of the shoulder 3 toward the thin groove 8, and a shoulder side groove wall surface 8b of the thin groove 8. A shoulder side curved portion 12 represents a portion where the inclined portion 11a and the shoulder side groove wall surface 8b are connected, and a tire transverse direction outermost portion at the shoulder side curved portion 12 is P. For example, the tire transverse direction outermost portion P is an intersection of the inclined portion 11a and the shoulder side groove wall surface 8b at the shoulder side curved portion 12. On the other hand, a sidewall side end portion at a sidewall side groove wall surface 8c of the thin groove 8 is Q. Namely, the sidewall side end portion Q represents an intersection, at the sidewall side groove wall surface 8c, of the sidewall side groove wall surface 8c and a surface 5a of the buttress 5.

The tire transverse direction outermost portion P at the shoulder side curved portion 12 is disposed further toward a tire radial direction inner side than the sidewall side end portion Q at the sidewall side groove wall surface 8c. Namely, the sidewall side end portion Q is disposed so as to become, toward a tire radial direction outer side, higher than the tire transverse direction outermost portion P. When a load F is applied to the pneumatic radial tire 1 according to the present invention in the unloaded state shown in FIG. 2A, the rib 7 of the shoulder 3 of the tread 2 contacts a road surface 20. At this time, the buttress 5 deforms so as to close the thin groove 8. Because the tire transverse direction outermost portion P is disposed further toward the tire radial direction inner side than the sidewall side end portion Q, the buttress 5 deforms further upward than the tire radial direction outermost portion P of the shoulder side curved portion 12 of the tire contour portion 11, i.e., so as to close the thin groove 8 at the road surface 20 side. Accordingly, the tire transverse direction outermost portion P at the shoulder side curved portion 12 is in a state of being covered by the buttress 5.

From the state shown in FIG. 2B, when a truck or the like to which the pneumatic radial tires 1 are mounted turns at an extremely low speed, lateral force Y arises. Due to the lateral force Y, the pneumatic radial tire 1 deforms such that the buttress 5 contacts the road surface 20. At this time, as the tire transverse direction outermost portion P of the shoulder side curved portion 12 is covered by the buttress 5 as described above, the tire transverse direction outermost portion P does not catch on the road surface 20. Accordingly, due to the lateral force Y, the buttress 5 can slide on the road surface 20, and it is possible to prevent the rib 7 of the shoulder 3 and the buttress 5 from becoming rigid bodies. Namely, it is possible to suppress an occurrence of a difference in rigidities at the tire contour portion 11, and cracks arising from a portion near a border of the difference in rigidities can be suppressed.

A difference between a tire radial direction distance H1, from a tire radial direction outermost portion H of the tread 2 shown in FIG. 1 to the sidewall side end portion Q at the sidewall side groove wall surface 8c, and a tire radial direction distance H2, from the tire radial direction outermost portion H to the tire transverse direction outermost portion P at the shoulder side curved portion 12, is preferably in a range between 2 millimeters and 10 millimeters. In particular, the range of the difference between H1 and H2 is preferable when the pneumatic radial tire 1 according to the present invention is a heavy-duty pneumatic radial tire at which a groove depth of the circumferential direction grooves 6 is approximately 30 millimeters. If the difference between H2 and H1 is less than 2 millimeters, when the load F shown in FIG. 2B is applied to the pneumatic radial tire 1, it is difficult for the buttress 5 to cover the tire transverse direction outermost portion P of the shoulder side curved portion 12, and an improvement in tear resistance of a shoulder cannot be achieved. On the other hand, if the difference between H2 and H1 is greater than 10 millimeters, when the truck or the like to which the pneumatic radial tires 1 are mounted rides up over a curb or the like at the road surface, the buttress 5 at the sidewall side, rather than the sidewall side groove wall surface 8c, may break, and its cut resistance markedly decreases.

Figure 3A:
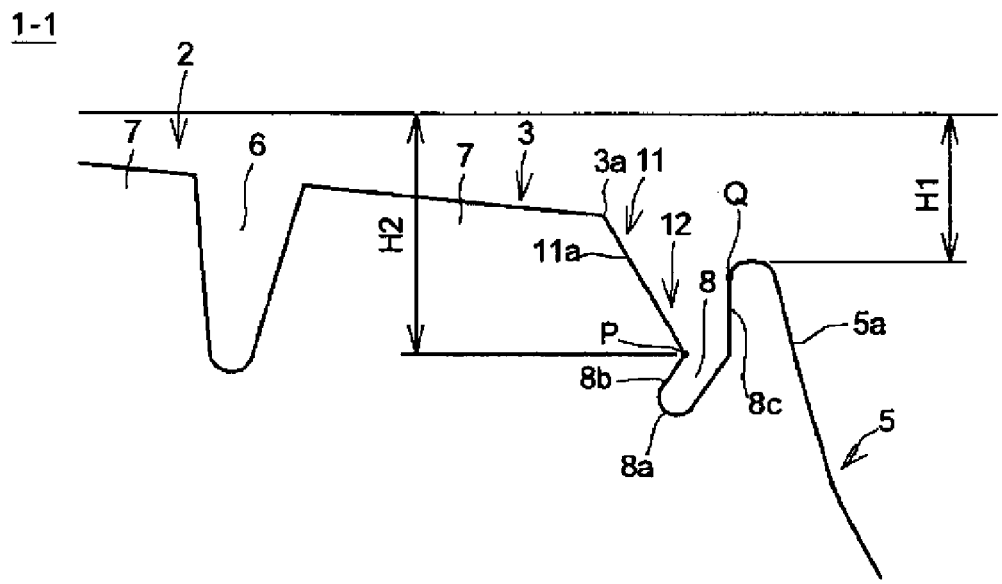
FIG. 3A is a schematic of another example of the pneumatic radial tire according to the present invention.
Figure 3B:
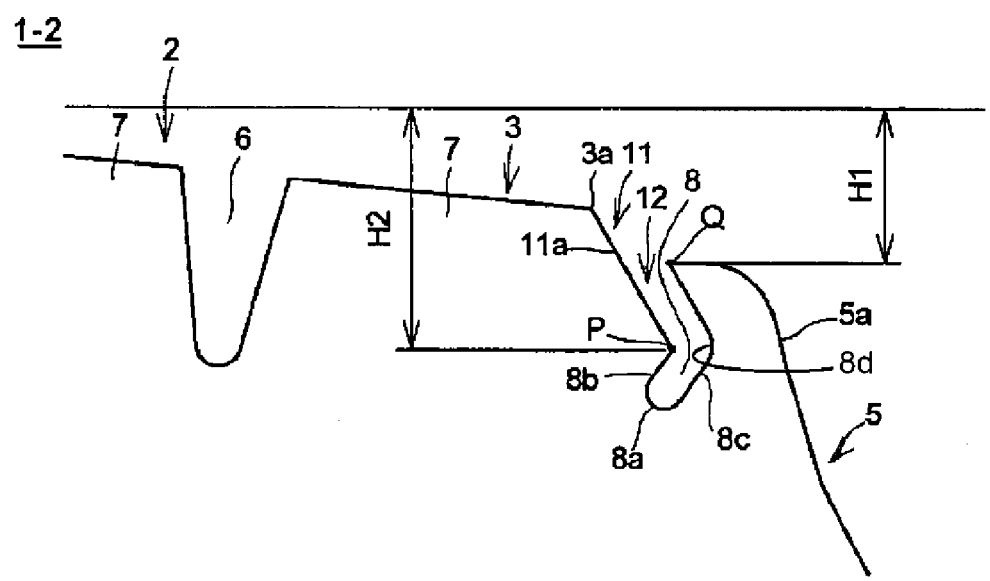
FIG. 3B is a schematic of still another example of the pneumatic radial tire according to the present invention.

Accordingly, a configuration of the pneumatic radial tire 1 shown in FIG. 1 is not limited provided that the difference between H1 and H2 is equal to or more than 2 millimeters. FIGS. 3A and 3B are schematics of another example of the pneumatic radial tire according to the present invention. For example, as with pneumatic radial tire 1-1 shown in FIG. 3A, the tire radial direction distance H1 may be small as compared with that of the pneumatic radial tire 1 shown in FIG. 1, i.e., the difference between H1 and H2 may be made to be large. In this case, the sidewall side groove wall surface 8c extends to the tire radial direction outer side, i.e., the buttress 5 at the sidewall side is formed so as to project toward the tire radial direction outer side. As compared with the sidewall side end portion Q at the sidewall side groove wall surface 8c of the pneumatic radial tire 1 shown in FIG. 1, the sidewall side end portion Q at the sidewall side groove wall surface 8c in this example is disposed further toward the tire radial direction outer side than the tire transverse direction outermost portion P at the shoulder side curved portion 12.

In a pneumatic radial tire 1-2 shown in FIG. 3B, the sidewall side groove wall surface 8c of the thin groove 8 is formed so as to extend, in the same way as the radial tire 1-1 shown in FIG. 3A, to the tire radial direction outer side, and specifically, further toward the tire radial direction outer side than the shoulder side curved portion 12 of the tire contour portion 11. The sidewall side groove wall surface 8c is formed so as to have a sidewall side curved portion 8d at a position facing the shoulder side curved portion 12 of the tire contour portion 11. Namely, the sidewall side groove wall surface 8c of the thin groove 8 is formed parallel to the tire contour portion.

In the pneumatic radial tire 1-2 shown in FIG. 3B, the buttress 5 deforms further upward than the tire transverse direction outermost portion P of the shoulder side curved portion 12 of the tire contour line 11, i.e., so as to close the thin groove 8 further toward the road surface 20 side (see FIGS. 2A to 2C). Accordingly, due to the lateral force, the buttress 5 can slide more on the road surface 20, and it is possible to even further prevent the rib 7 of the shoulder 3 and the buttress 5 from becoming rigid bodies. Namely, it is possible to further suppress an occurrence of a difference in rigidities at the tire contour portion 11, and cracks arising from a portion near a border of the difference in rigidities can be suppressed even more.

Hereinafter, an explanation will be given of results of carrying out a running test on pneumatic radial tires of a conventional example and a comparative example and the pneumatic radial tire according to the present invention. A tire size of all of the tires used in this running test was 295/75R22.5. The running test was carried out with the respective tires mounted to standard rims in accordance with a standard set by Tire and Rim Association (TRA), European Tire and Rim Technical Organization (ETRTO), Japan Automobile Tire Manufacturers Association (JATMA), or the like, and mounted to a trailer axis of a trailer of a truck, and the air pressures of the respective tires being 760 kilopascals. The respective items are as follows.

The tear resistance at the shoulder was evaluated by turning the truck, on which the pneumatic radial tires were mounted, in a constant circle, i.e., turning the truck four times in a circle such that the trailer axis was the core, and evaluating, as an index, a state of occurrence of tearing-off at the rib (block) 7 of the shoulder 3 of the tread 2.

The uneven wear resistance was evaluated by running the truck, on which the pneumatic radial tires were mounted, for 20,000 kilometers, and evaluating, as an index, a ratio of wear of the rib (block) 7 of the shoulder 3 with respect to the tread 2 overall.

The cut resistance (curb) was evaluated by evaluating, as an index, a state of occurrence of cutting (breaking) of the buttress 5 at the time when the pneumatic radial tire rode up on the curb at an angle of 30 degrees with respect to the curb from a state in which the curb and the tire circumferential direction of the pneumatic radial tire mounted to the truck were parallel.

For each of the items, "Conventional Example 1" is given a score of 100, and higher values are better scores.

Figure 4A:
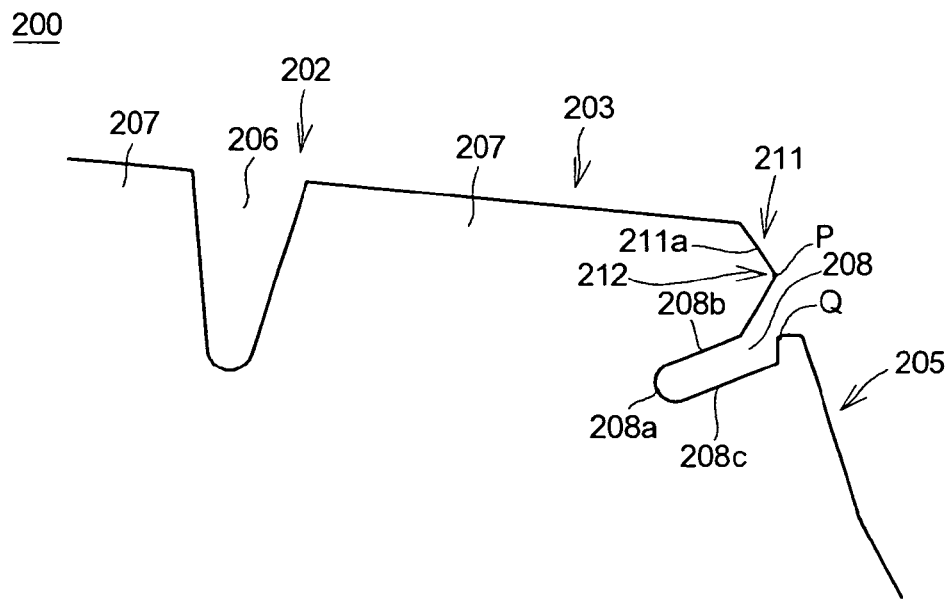
FIG. 4A is a schematic of an example of a pneumatic radial tire for a comparison.
Figure 4B:
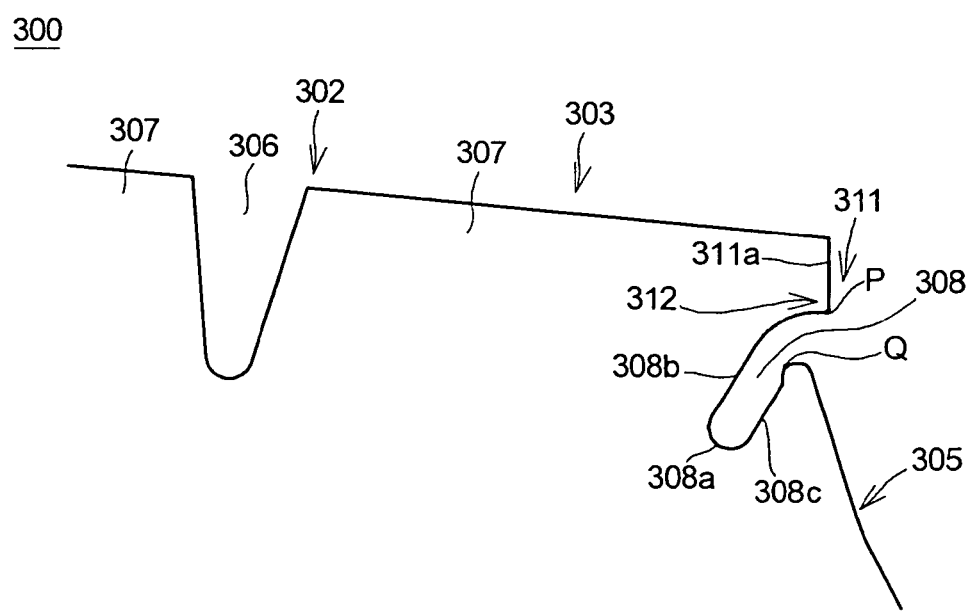
FIG. 4B is a schematic of another example of the pneumatic radial tire for a comparison.
Figure 5A:
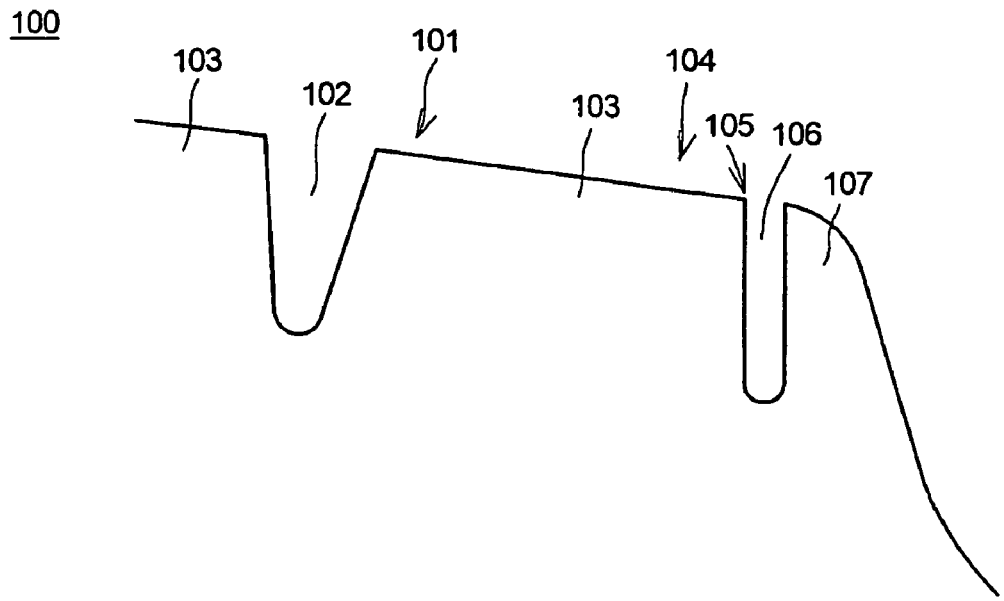
FIG. 5A is a schematic of an example of a conventional pneumatic radial tire.
Figure 5B:
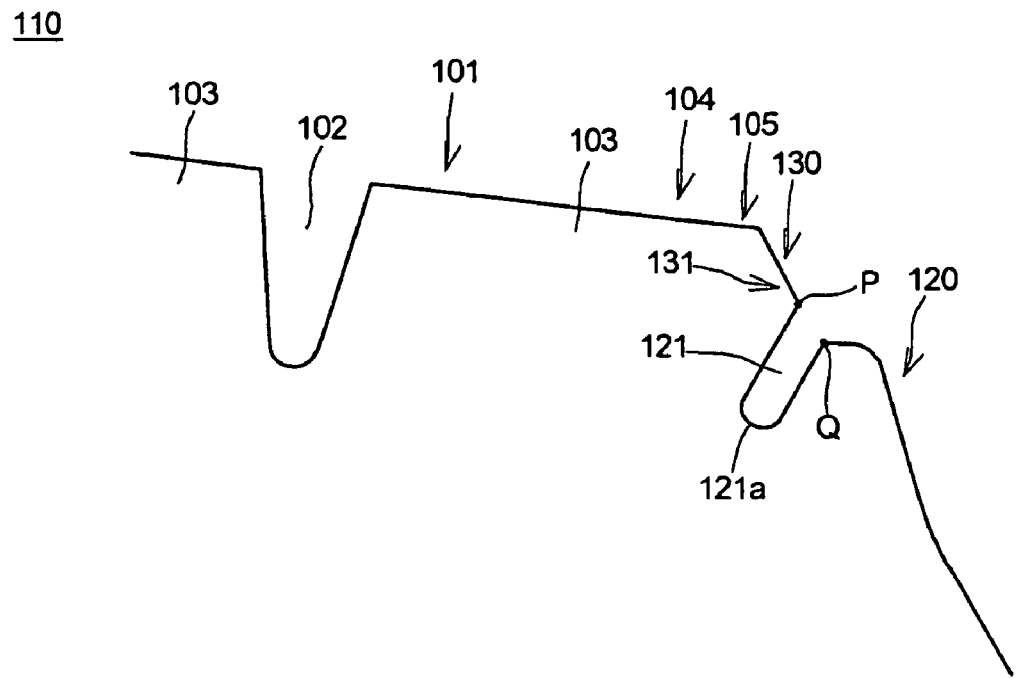
FIG. 5B is schematic of another example of the conventional pneumatic radial tire.
Figure 6A:
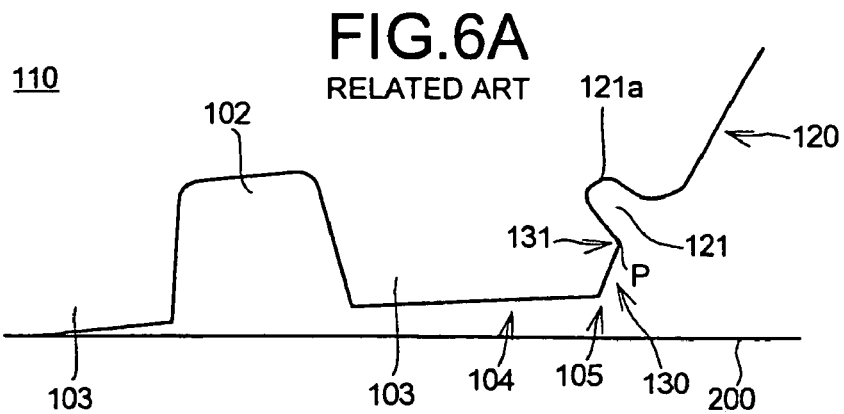
FIG. 6A is a schematic for illustrating a relationship between the road surface and the conventional pneumatic radial tire in an unloaded state.
Figure 6B:
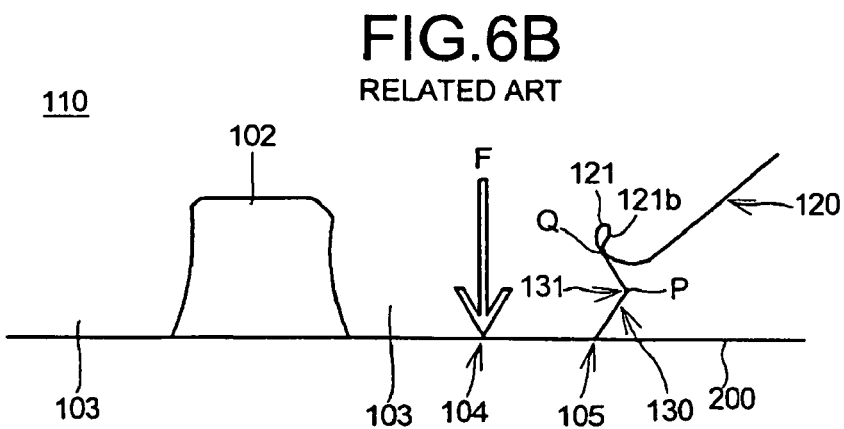
FIG. 6B is a schematic for illustrating a relationship between the road surface and the conventional pneumatic radial tire in a loaded state.
Figure 6C:
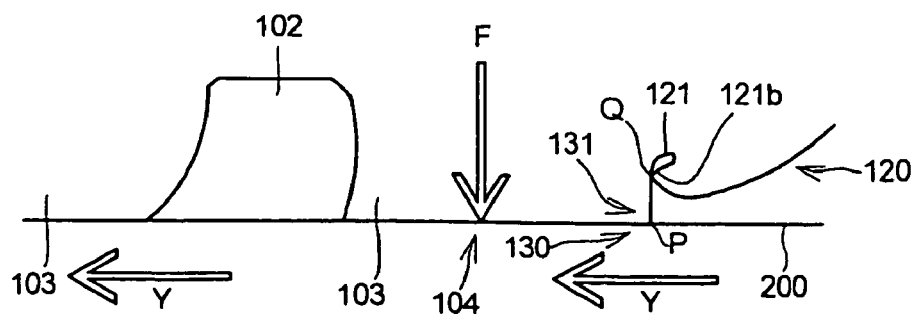
FIG. 6C is a schematic for illustrating a relationship between the road surface and the conventional pneumatic tire that is in the loaded state and at which lateral force has arisen.

Results of carrying out the above running test are shown hereinafter. In the following table, "Conventional Example 1" is the conventional pneumatic radial tire 100 shown in FIG. 5A. "Conventional Example 2" is the conventional pneumatic radial tire 110 shown in FIG. 5B. "Comparative Example 1" is a pneumatic radial tire 200 shown in FIG. 4A, and is an arrangement in which the sidewall side end portion Q at a sidewall side groove wall surface 208c of a thin groove 208 is disposed further toward the tire radial direction inner side than the tire transverse direction outermost portion P at a shoulder side curved portion 212 of a tire contour portion 211. "Comparative Example 2" is a pneumatic radial tire 300 shown in FIG. 4B, and is an arrangement in which the sidewall side end portion Q at a sidewall side groove wall surface 308c of a thin groove 308 is disposed further toward the tire radial direction inner side than the tire transverse direction outermost portion P at a shoulder side curved portion 312 of a tire contour portion 311. Further, the tire transverse direction outermost portion P at the shoulder side curved portion 312 is disposed further toward a tire transverse direction outer side than the sidewall side end portion Q at the sidewall side groove wall surface 308c. "Present Invention 1" is the pneumatic radial tire 1 according to the present invention and shown in FIG. 1. "Present Invention 2" is the pneumatic radial tire 1-1 according to the present invention and shown in FIG. 3A. "Present Invention 3" is the pneumatic radial tire 1-2 according to the present invention and shown in FIG. 3B.

TABLE 1

|  | Conventional Example 1 | Conventional Example 2 | Comparative Example 1 | Comparative Example 2 | Present Invention 1 | Present Invention 2 | Present Invention 3 |
|---|---|---|---|---|---|---|---|
| Tear resistance at the shoulder | 100 | 89 | 89 | 78 | 106 | 109 | 109 |
| Uneven wear resistance | 100 | 111 | 111 | 100 | 111 | 111 | 111 |
| Cut resistance (curb) | 100 | 119 | 119 | 131 | 119 | 106 | 106 |

As is clear from the table, "Present Invention 1", which is the pneumatic radial tire 1 according to the present invention, has improved tear resistance at the shoulder over "Conventional Example 1", in which the thin groove 106 is provided in the end portion 105 of the shoulder 104, and "Conventional Example 2", in which the tire transverse direction outermost portion P at the shoulder side curved portion 131 is disposed further toward the tire radial direction outer side than the sidewall side end portion Q of the sidewall side groove wall surface 121b. Further, at least the uneven wear resistance and the cut resistance were maintained (were improved in the table). As compared with "Conventional Example 1" and "Conventional Example 2", "Comparative Example 1" and "Comparative Example 2" have improved uneven wear resistance and cut resistance, but the tear resistance at the shoulder is lower.

As compared with "Present Invention 1", "Present Invention 2" and "Present Invention 3" have improved tear resistance at the shoulder. "Present Invention 2" and "Present Invention 3" have lower cut resistance than "Present Invention 1", but can maintain the same level of cut resistance as "Conventional Example 1" and "Conventional Example 2".

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A pneumatic radial tire having a thin groove continuous in a tire circumferential direction at a buttress formed between a shoulder of a tread and a sidewall, comprising:
   a tire contour portion that is formed between an end portion of the shoulder and a groove floor of the thin groove,
   wherein a tire transverse direction outermost portion at a shoulder side curved portion is disposed farther toward a tire radial direction inner side than a sidewall side end portion of a sidewall side groove wall surface of the thin groove,
   wherein the tire contour portion includes an inclined portion from the end portion of the shoulder toward the thin groove and a shoulder side wall surface of the thin groove,
   wherein the tire transverse direction outermost portion is an intersection of the inclined portion and the shoulder side groove wall surface at the shoulder side curved portion,
   wherein the end portion of the shoulder is closer to a width center of the tire in a width direction than the entire thin groove,
   wherein said sidewall side end portion of the sidewall side groove wall surface of the thin groove is radially inside said end portion of said shoulder, and axially outside the tire transverse direction outermost portion at the shoulder side curved portion, and
   further wherein said sidewall side end portion of the sidewall side groove wall surface of the thin groove contacts said inclined portion when the buttress is deformed by a lateral force.

2. A pneumatic radial tire having a thin groove continuous in a tire circumferential direction at a buttress formed between a shoulder of a tread and a sidewall, comprising:
   a tire contour portion that is formed between an end portion of the shoulder and a groove floor of the thin groove,
   wherein a tire transverse direction outermost portion at a shoulder side curved portion is disposed further toward a tire radial direction inner side than a sidewall side end portion of a sidewall side groove wall surface of the thin groove,
   wherein a difference between a first tire radial direction distance from a tire radial direction outermost portion of the tread to the tire transverse direction outermost portion and a second tire radial direction distance from the tire radial direction outermost portion of the tread to the sidewall side end portion is in a range between 2 millimeters and 10 millimeters,
   wherein the end portion of the shoulder is closer to a width center of the tire in a width direction than the entire thin groove,
   wherein said sidewall side end portion of the sidewall side groove wall surface of the thin groove is radially inside said end portion of said shoulder, and axially outside the tire transverse direction outermost portion at the shoulder side curved portion, and
   further wherein said sidewall side end portion of the sidewall side groove wall surface of the thin groove contacts an inclined portion of the tire contour portion when the buttress is deformed by a lateral force.

3. A pneumatic radial tire comprising:
   a buttress between a shoulder of a tread and a sidewall, and a thin groove extending into said buttress to a groove floor, wherein:
   a tire contour portion intersects an end portion of said shoulder and said groove floor, an inclined portion of said tire contour portion and a shoulder side groove wall surface of said tire contour portion intersecting a tire transverse direction outermost portion at a shoulder side curved portion,
   a sidewall side groove wall surface of said thin groove intersects said groove floor, said sidewall side groove wall surface and said buttress intersecting at a sidewall side end portion, said tire transverse direction outermost portion being disposed further toward a tire radial direction inner side than said sidewall side end portion,
   a first tire radial direction distance is from a tire radial direction outermost portion of said tread to said tire transverse direction outermost portion, a second tire radial direction distance being from said tire radial direction outermost portion of said tread to said sidewall side end portion, the difference between said first and second tire radial direction distances being in a range between 2 millimeters and 10 millimeters,
   wherein said thin groove is continuous in a tire circumferential direction,
   wherein the end portion of the shoulder is closer to a width center of the tire in a width direction than the entire thin groove,
   wherein said sidewall side end portion of the sidewall side groove wall surface of the thin groove is radially inside said end portion of said shoulder, and axially outside the tire transverse direction outermost portion at the shoulder side curved portion, and
   further wherein said sidewall side end portion of the sidewall side groove wall surface of the thin groove contacts said inclined portion when the buttress is deformed by a lateral force.

* * * * *